United States Patent
Jones

(10) Patent No.: US 11,715,246 B1
(45) Date of Patent: Aug. 1, 2023

(54) MODIFICATION AND TRANSFER OF CHARACTER MOTION

(71) Applicant: Apple Inc., Cupertino, CA (US)

(72) Inventor: Scott R. Jones, San Rafael, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/781,369

(22) Filed: Feb. 4, 2020

Related U.S. Application Data

(60) Provisional application No. 62/804,373, filed on Feb. 12, 2019.

(51) Int. Cl.
*G06T 13/40* (2011.01)

(52) U.S. Cl.
CPC .......... *G06T 13/40* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 7,151,542 B2 | 12/2006 | Isner | |
| 8,542,238 B2 | 9/2013 | Niles et al. | |
| 9,619,914 B2 | 4/2017 | de Aguiar et al. | |
| 10,049,484 B2 | 8/2018 | Kim et al. | |
| 10,239,218 B1 * | 3/2019 | Jackson | B25J 18/005 |
| 2007/0126742 A1 * | 6/2007 | Bar-Lev | G06T 13/00 345/473 |
| 2013/0120403 A1 * | 5/2013 | Maloney | G06T 13/00 345/473 |
| 2014/0088746 A1 * | 3/2014 | Maloney | G05B 19/4099 700/97 |
| 2017/0028643 A1 * | 2/2017 | Grossman | B29C 64/386 |
| 2019/0005699 A1 * | 1/2019 | Anderson | G06T 13/40 |
| 2019/0139288 A1 * | 5/2019 | Kelly | G06T 7/251 |
| 2019/0385313 A1 * | 12/2019 | Cavallo | G06F 16/78 |
| 2020/0035010 A1 * | 1/2020 | Kim | G06T 13/40 |

FOREIGN PATENT DOCUMENTS

WO   WO 2017190213   11/2017

* cited by examiner

*Primary Examiner* — Saptarshi Mazumder
(74) *Attorney, Agent, or Firm* — Thompson Hine LLP

(57) ABSTRACT

Various implementations disclosed herein include devices, systems, and methods for modifying character motion for 3D animated assets (e.g., modifying character motions). In some implementations, an object to be animated is identified, where the object is a part of a three dimensional (3-D) digital model. In some implementations, a motion descriptor is identified that includes path-generating components that generate a preliminary motion path for animation of the object. The motion descriptor is modified to generate a modified motion path, where the motion descriptor is modified by deforming at least one path-generating component of the motion descriptor, and the object is animated based on the modified motion path. In some implementations, the modified motion path is transferred to another 3D animated asset (e.g., the same or a different type of 3D animated asset).

24 Claims, 11 Drawing Sheets

MODIFICATION AND TRANSFER OF CHARACTER MOTION

CROSS-REFERENCE TO RELATED APPLICATION

This Application claims the benefit of U.S. Provisional Application Ser. No. 62/804,373 filed Feb. 12, 2019, which is incorporated herein in its entirety.

TECHNICAL FIELD

The present disclosure generally relates to creating three dimensional (3D) content, and in particular, to systems, methods, and devices for modifying character motion for 3D animated assets and transferring selected character motions among 3D animated assets of the same or different morphologies in 3D layouts.

BACKGROUND

Creating 3D content using computer-implemented content creation systems can be very time consuming, non-intuitive, and difficult. Creating motion for 3D characters in 3D content can be particularly burdensome. Using some existing systems, a 3D character may be animated by creating a 3D model that defines how that character can or will move (e.g., walk). The 3D model of such a 3D character may use a motion generating mechanism to define movement, for example, defining motion curves (e.g., movement paths) for particular portions of the 3D character. While users can create and modify the components of such motion-generating mechanisms, the user's ability to use such components to precisely define movements is often complicated or prohibited by the rigid nature of the components.

SUMMARY

Various implementations disclosed herein include devices, systems, and methods that enable more intuitive or efficient creation and modification of motion curves for a portion of an 3D animated asset in a 2D/3D layout. In some implementations, an electronic device having a processor implements a method to assign a preliminary 3D motion curve to a portion (e.g., a limb) of a 3D animated asset. A motion descriptor generates the preliminary 3D motion curve. The motion descriptor includes a plurality of coupled path-generating components (e.g., gears, cams, connectors, bars, linkages). Various implementations modify the 3D preliminary motion curve based on user input to (i) change a timing or a path of the displayed 3D preliminary motion curve (e.g., a user can click and drag to change curve), or (ii) deform one or more of the path-generating components (e.g., movable and deformable squishy gear mechanisms) of the motion descriptor to make a modified 3D motion path.

Various implementations identify existing repeatable 3D motion curves of a first animated character and replicate the 3D motion curves on a second animated character of the same or different morphology (e.g., biomechanical structure). In some implementations, 3D motion curves are transferred from the first 3D animated asset to the second 3D animated asset, which has a different morphology (e.g., biomechanical structures, scalability), while important aesthetical aspects (e.g., animation technicalities, caricature features) identifiable to the first 3D animated character are maintained.

Various implementations disclosed herein include devices, systems, and methods for modifying character motion for 3D animated assets (e.g., modifying character motions in a computer generated reality (CGR) setting on an electronic device such as a head mounted display (HMD). In contrast to the physical environment, a CGR environment refers to an entirely or partly computer-created setting that individuals can sense or with which individuals can interact via an electronic system. In some implementations, an object to be animated is identified, where the object is a part of a three dimensional (3-D) digital model. In some implementations, a motion descriptor is identified that includes path-generating components that generate a preliminary motion path for animation of the object. The motion descriptor is modified to generate a modified motion path, where the motion descriptor is modified by modifying at least one path-generating component of the motion descriptor, and the object is animated based on the modified motion path.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
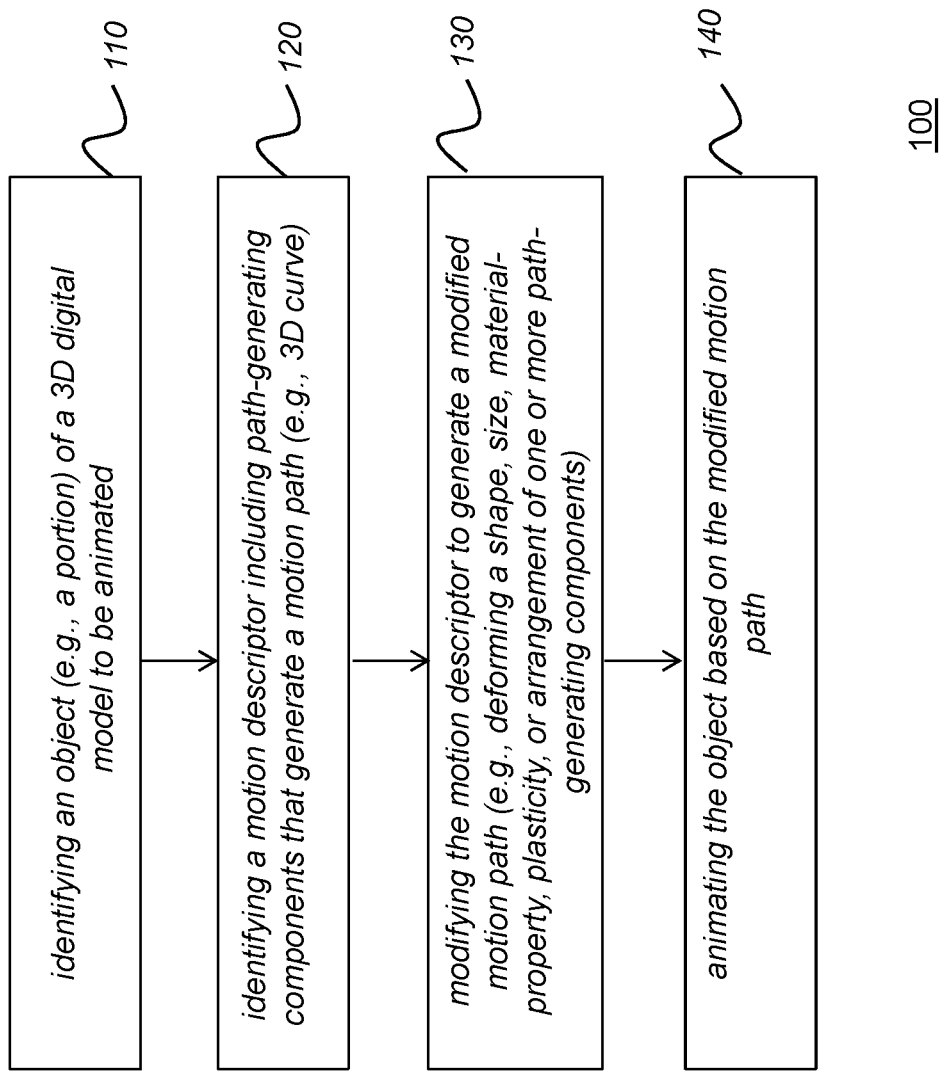
FIG. 1 is a flowchart illustrating an exemplary method of selectively modifying character motion according to some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 is a flowchart illustrating an exemplary method 100 of selectively modifying character motion. In some implementations, the method 100 is performed by a device (e.g., controller 910 or electronic device 920 of FIGS. 9-11). The method 100 can be performed at a mobile device, HMD, desktop, laptop, server device, or by multiple devices in communication with one another. In some implementations, the method 100 is performed by processing logic, including hardware, firmware, software, or a combination thereof. In some implementations, the method 100 is performed by a processor executing code stored in a non-transitory computer-readable medium (e.g., a memory).

At block 110, the method 100 identifies an object to be animated, where the object is a part of a three dimensional (3-D) digital model. For example, the object may be identified by user input placing the object into a work area or by user input selecting the object within such a work area. In some implementations, the object will be animated by a repeatable 3D motion path (e.g., a curve). In some implementations, the object is a limb of a 3D digital character. For example, a foot or hand can be selected as the object, and additional attached portions of the limb of the character will move with the selected object as the selected object moves along the 3D motion path. When the hand is the object, for example, a wrist, forearm, elbow, upper arm and shoulder may move according to the movements of the hand as the hand is moved along a defined 3D motion path. In some implementations, the hand is considered a primary object, and the wrist, elbow, arm, and shoulder are considered driven objects or secondary objects. In some implementations, secondary objects do not require an individual 3D motion path when defining character motion, but have their motion controlled by the 3D motion path of the primary object. In some implementations, the user is a content creator or a person using the electronic device in a CGR environment.

At block 120, the method 100 identifies a motion descriptor or a motion generator (e.g., 4 bar linkage, 6 bar linkage, a set of gears, connectors, pivot points, etc., or combination thereof) including a plurality of path-generating components (e.g., individual gears, cams, or connectors) that generate a preliminary motion path for animation of the object. For example, the preliminary motion path can be a repeated motion (e.g., loop) taken by the character's left foot when walking. In some implementations, the motion descriptor can be identified based on motion capture (e.g., machine-learning applications or algorithms) or a user selection from a library of character motions and corresponding motion descriptors. For example, motion capture may produce a 3D motion path, and one motion descriptor can be selected from the library of character motions based on the corresponding motion path being similar to that motion capture motion path.

At block 130, the method 100 modifies the motion descriptor to generate a modified motion path, where the motion descriptor is modified by modifying or deforming (e.g., changing the shape, size, material-property, plasticity, or arrangement) a path-generating component of the motion descriptor. In some implementations, the modified motion path is based on receiving user input to deform (e.g., directly change characteristics of) one or more of the plurality of path-generating components of the motion descriptor. In some implementations, such user input is received using known input devices for a CGR environment including identifying a 3D hand gestures, a 3D movement of a 3D input device, e.g., a user moves the table using a six degree of freedom input device, voice or touch inputs, gaze tracking, physical inputs including keyboards and a mouse, or the like. In some implementations, the deformed path-generating component(s) is/are deformed, for example, by changing shape, size, material-property, or plasticity. In some implementations, the modified motion descriptor includes a modified number of path-generating components, modified sizes of the path-generating components, modified positions of the path-generating components, modified connections of the path-generating components, and an amount of deformation (e.g., squishiness, stiffness) for any path-generating components identified to be deformable.

At block 130, in some alternative implementations, the motion descriptor is modified indirectly, e.g., based on receiving user input to change the displayed 3D preliminary motion path itself. For example, based on receiving input elongating a motion path, a particular path-generating component of the motion descriptor may be elongated or otherwise deformed to result in the elongated motion path. In some implementations, the displayed preliminary motion path is changed by a modification to a characteristic of a displayed timing or a 3D spatial modification to the displayed curve of the preliminary motion path.

At block 140, the method 100 animates the object based on the modified motion path. For example, the method 100 may animate a foot by moving it along a curve of the modified motion path. In some implementations, the modified motion path is repeatable or cyclic (e.g., as the character walks the foot moves around an elliptical curve again and again). The character itself may translate or otherwise move as a whole as parts of the character are moved along repeating motion paths. Thus, as the character moves down the pathway, the motion of each foot (and secondary objects attached thereto) move along repeating elliptical motion paths.

In some implementations, the animation of the object or character can be stored. For example, the animation can be stored by animating the object and caching the position/state of an entire mesh of the character for each frame during the animation.

Figure 2:
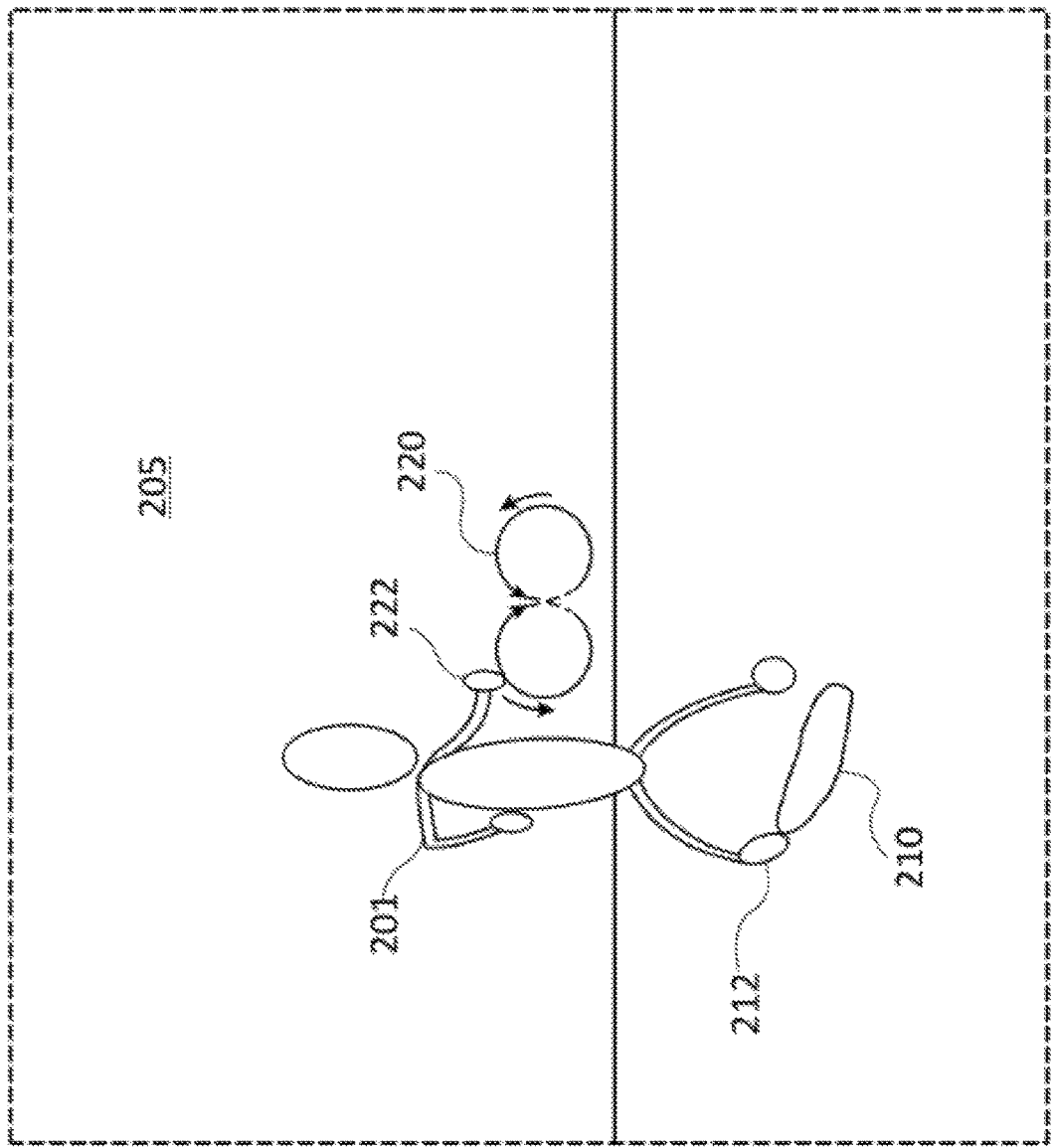
FIG. 2 is a diagram that illustrates a jointed 3D animated asset or digital character using a particular motion curve (e.g., repeatable movement pattern(s)) for one or more limbs according to some implementations.

FIG. 2 illustrates exemplary motion paths 210, 220 used to determine motion of an object of a 3D digital model according to some implementations. In some implementations, repeatable motion paths, such as motion paths 210, 220 shown in FIG. 2, are generated by exemplary motion descriptors as described herein.

As shown in FIG. 2, a 3D digital model or character 201 can have a particular motion curve (e.g., repeatable movement pattern(s)) for one or more limbs. In some implementations, each limb includes a particular motion path. As shown in FIG. 2, a character 201 includes a 3D motion curve 210 for a first limb or right foot 212 and a 3D motion curve 220 for a second limb or left hand 222. As shown in FIG. 2, when the character 201 is walking, the right foot 212 will make a particular 3D pattern or arc that follows the motion path 210. When the character 201 is walking, the left hand 222 will make a particular 3D pattern that follows the motion curve 220. In FIG. 2, the character 201 is shown in an example 2D/3D environment 205.

In various implementations, the motion for a character or 3D digital model (e.g., a skeletal structure with a surrounding mesh) can be defined as a path through the center of the 3D digital model as well as a path for each of a set of limbs or primary objects relative to the center during the character movements (motion). In some implementations, motion capture is used to identify and classify movements of the entire digital character into a mechanical structure with definable motion paths for actions of a defined set of objects (e.g., limbs). In some implementations, each motion path for an object is one of a set of motion paths of the object for different stages of movement of the character, where the stages of movement include different types of actions (e.g., walk, jog, run, jump, etc.,) and a plurality of respective transition actions between each of the stages of movement. In some implementations, however the character motion is determined such that defined movements together with a skeleton (e.g., joints and bones) and an associated surface mesh completely describe animation of a particular morphology or biomechanical structure for a 3D digital model.

In some implementations, there are user-defined criteria to prioritize among motions paths (e.g., joints or objects in the character skeleton). For example, movement patterns for a character's feet can be considered more important within the character morphology than movement patterns for hands of the character. In this example, movement patterns of the feet will be prioritized over movements of the character's hands, which can be allowed to deviate from desired hand movements, if necessary to allow the character's feet movements to be correct. In some implementations, prioritization of objects make the overall character animation more realistic.

FIGS. 3A-3B are diagrams that show an exemplary motion descriptor or motion generator (e.g., 4 bar linkage, 5-bar linkage, 6-bar linkage, etc., or a set of gears, connectors, etc., or combinations thereof) including a plurality of path-generating components (e.g. individual gears) that generate a preliminary motion path for animation of an object. As shown in FIG. 3A, a motion descriptor 300 includes a first gear 310 with a fixed point 312, a first bar 320 connected to the first gear 310, a second bar 330 connected between the first bar 320 and a second gear 340, which has a fixed point 342. As the motion descriptor 300 moves, the first gear 310 rotates in a counterclockwise direction and the second gear rotates clockwise to generate a 3D motion curve 350 defined by point 334 on the second bar 330. The 3D motion curve 350 is partially drawn in FIG. 3A. The 3D motion curve 350 is completely drawn in FIG. 3B upon completion of one revolution of the first gear 310 and the second gear 340. In some implementations, the gear 310 rotates in a clockwise direction and the gear 340 rotates counterclockwise to generate the motion curve 350 traveling in an opposite direction. In FIGS. 3A-3B, the motion descriptor 300 is shown in an example 2D/3D environment 305.

Figure 3:
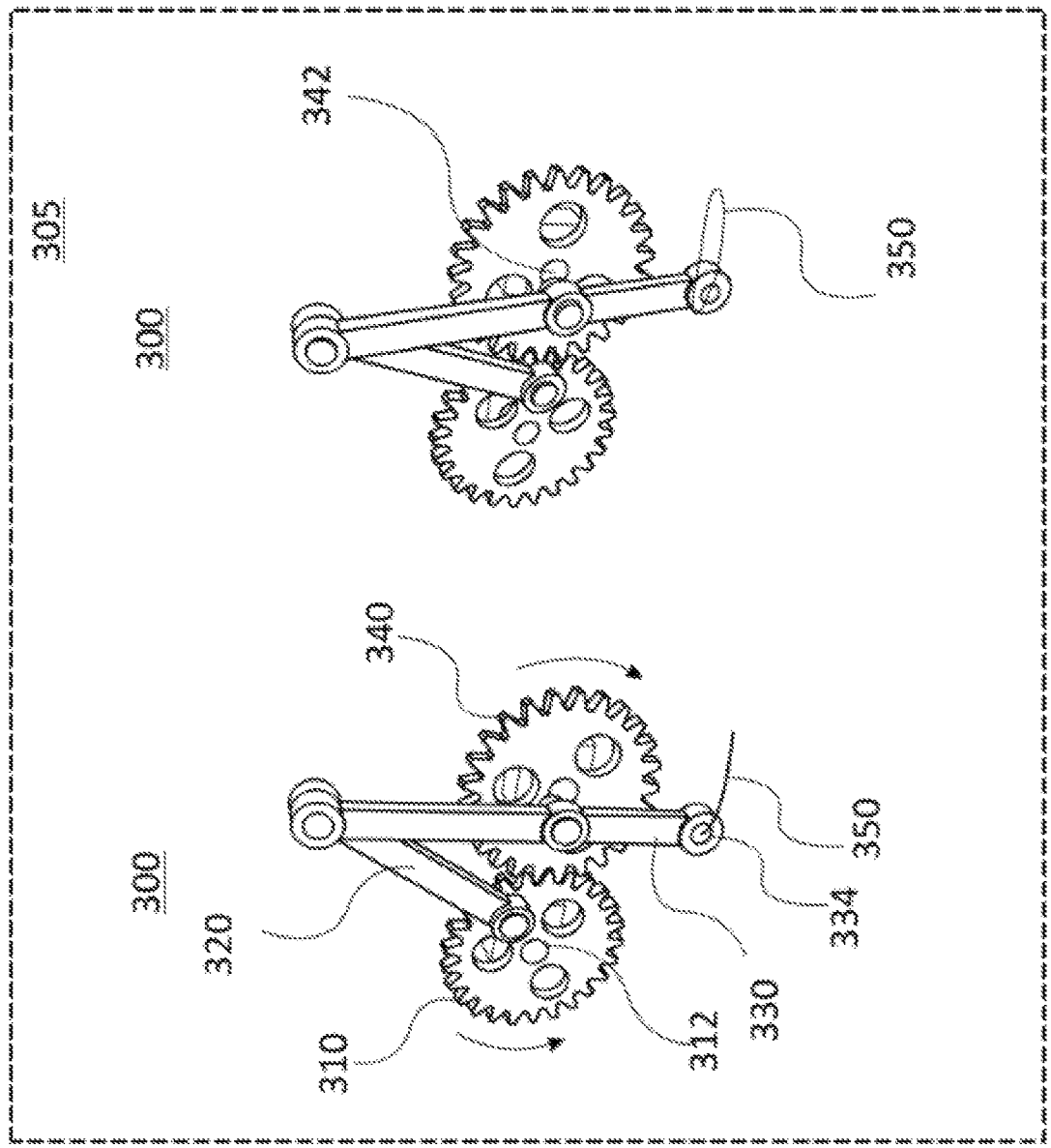
FIGS. 3A-3B are diagrams that show an exemplary mechanism to create a 3D curve according to some implementations.
Figure 4:
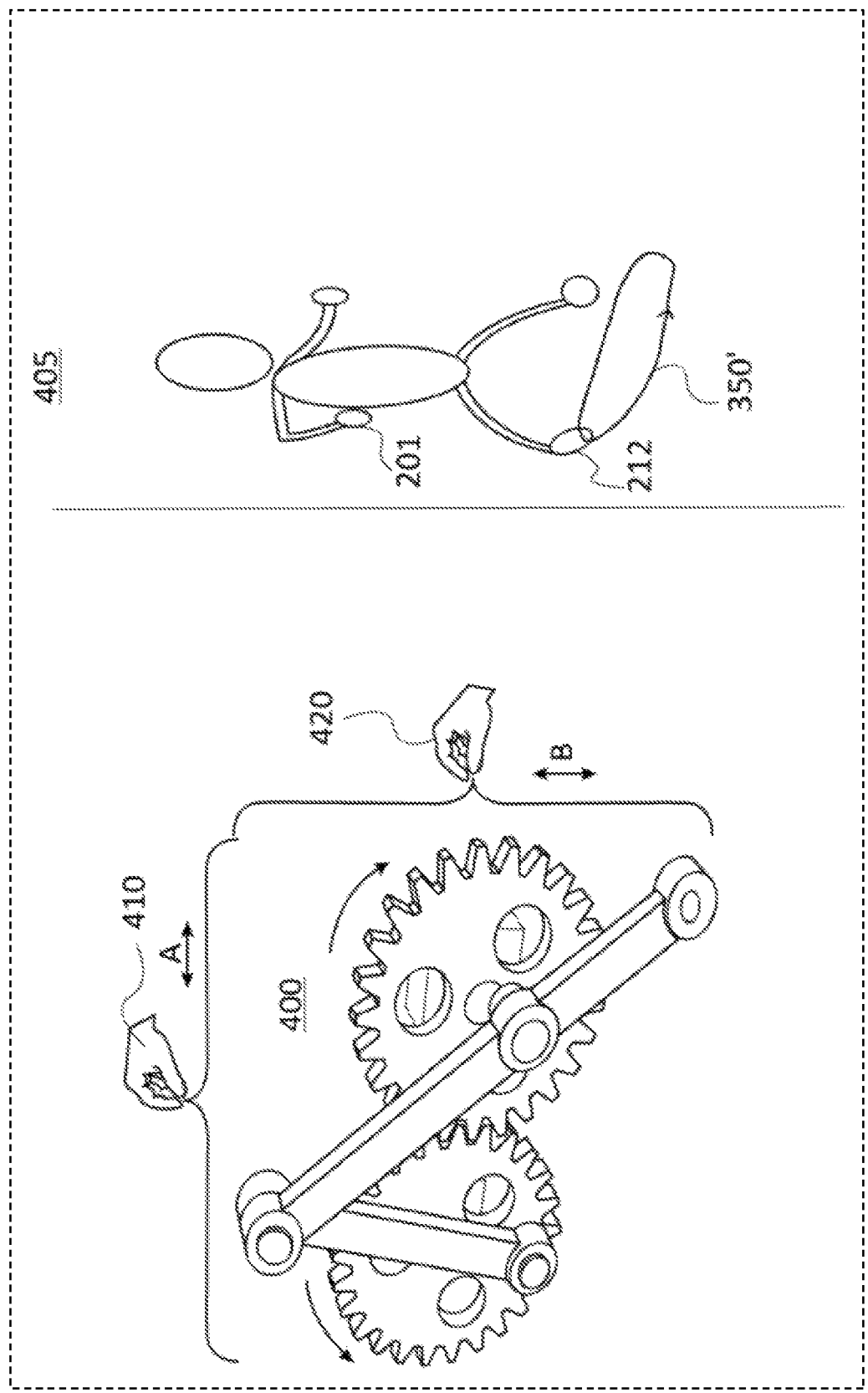
FIGS. 4-6 are diagrams that show an exemplary user interface allowing deformation of a motion descriptor to generate a modified motion path according to some implementations.
Figure 5:
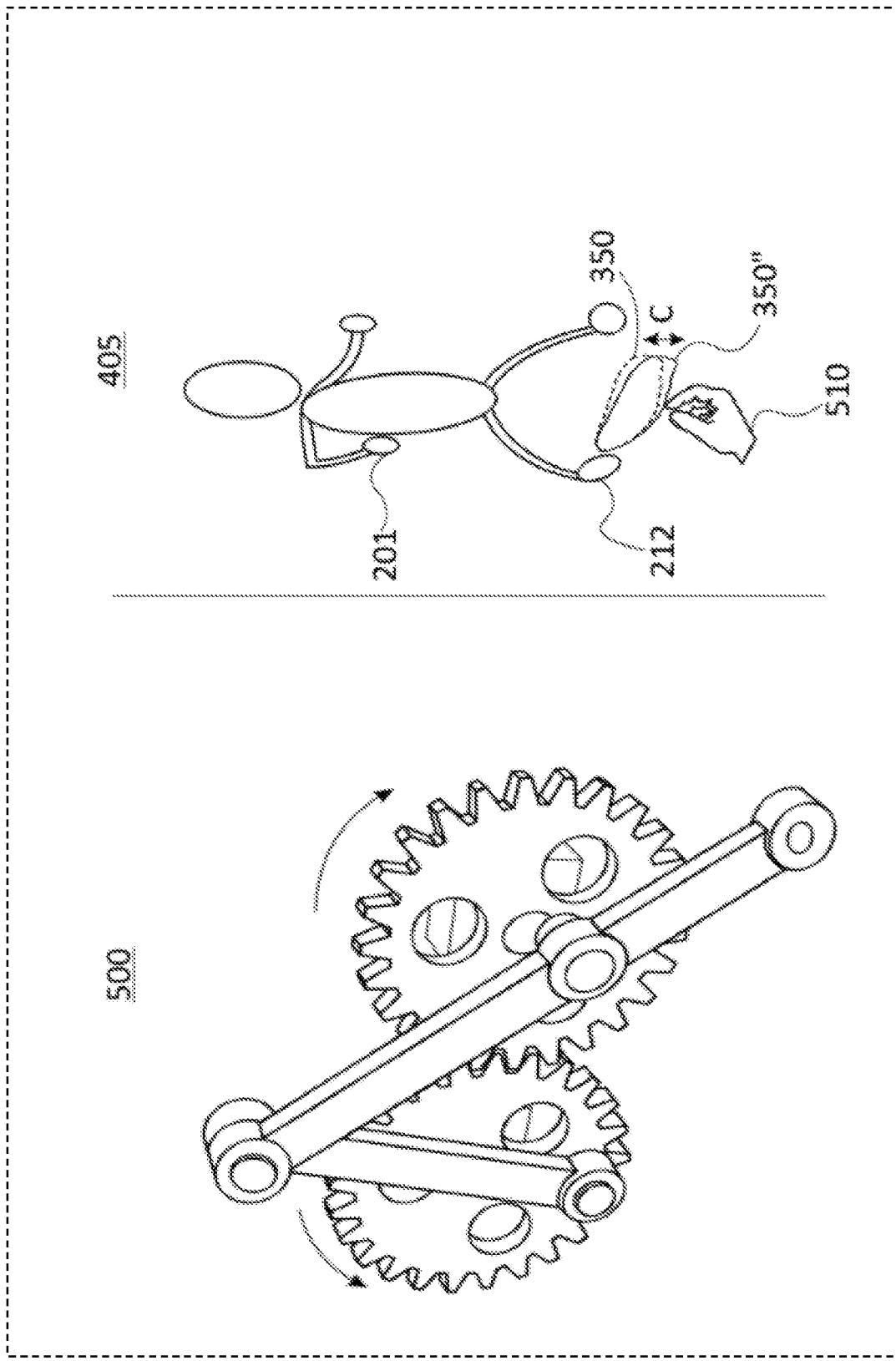
Figure 6:
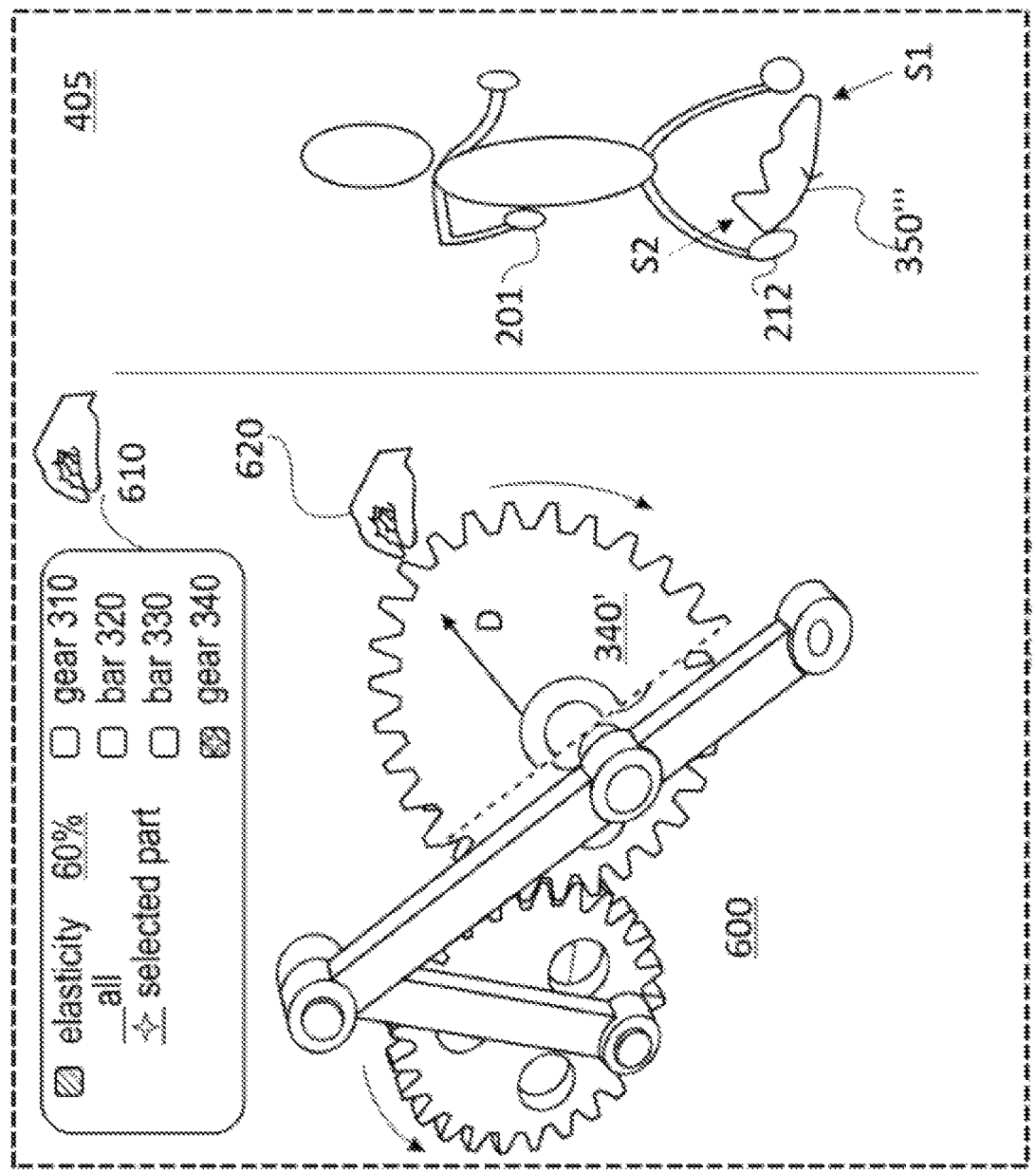

FIGS. 4-6 are diagrams that show an exemplary user interface allowing deformation or modification of a motion descriptor to generate a modified motion path, (e.g., based on receiving input to directly change characteristics of components of the motion descriptor or input to change the 3D motion path itself). In some implementations, the motion descriptor 300 (FIG. 3) is modified by deforming at least one of its path-generating components. In some implementations, the user can interactively modify the 3D curve 350 to generate (e.g., in real-time or not) a new updated 3D motion curve 350'. In some implementations, the motion descriptor 300 is modified by deforming (e.g., visually modifying the 3D shape or timing) the displayed 3D motion curve 350 currently displayed into the shape of the modified 3D motion curve 350', which is then mapped to the underlying the motion descriptor 300, and deforms at least one path-generating component of the motion descriptor 300 to generate the modified 3D motion curve 350'. In some implementations, the deformed at least one path-generating component of the motion descriptor 300 (FIG. 3) is modified to show the deformations that cause the generation of the modified 3D motion curve 350'. FIGS. 4-6 depict motion descriptors in an example 3D environment 405 (e.g., a CGR environment).

As shown in FIG. 4, the motion descriptor 300 of FIG. 3 has been deformed into motion descriptor 400 that results in modified 3D motion curve 350'. As shown in FIG. 4, first operation 410 (e.g., user input via a hand gestor) proportionally increased a first dimension A of the path-generating components of the motion descriptor 300 of FIG. 3 by 10%. A second operation 420 (e.g., user input via a hand gestor) proportionally decreased a second dimension B of the path-generating components of the motion descriptor 300 of FIG. 3 by 30%. In some implementations, the first operation 410 and second operation 420 can be performed in reversed order or concurrently. The result of the first operation 410 and second operation 420 is the modified motion descriptor 400 that results in modified 3D motion curve 350'. In some operations, the motion descriptor 400 and the modified 3D motion curve 350' can be stored for future use (e.g., added to a library of motion descriptors).

In some implementations, modifying the motion descriptor 300 includes deforming the one or more path-generating components by changing proportional size, number of components, material properties of one or more components, dynamic material properties of one or more components, shape of one or more components, speed over time of one or more components, positons of one or more components, pivot points of one or more components, connections of one or more components, or shape over time of one or more components. Such exemplary deformations can be performed sequentially, in combination, or concurrently. In some implementations, deforming the motion descriptor 300 results in immediate variation to the displayed corresponding 3D motion curve (e.g., into motion curve 350'). Accordingly, in some implementations, the user interactively makes and reviews changes to the motion curve 350 (e.g., into motion curve 350', 350", 350"').

In some implementations, deformations to the one or more path-generating components of the motion descriptor 300 modify a virtual configuration (e.g., arrangement, individual spatial dimensions) of the path-generating components. In some implementations, deformations to the one or more path-generating components of the motion descriptor 300 modify a virtual material property (e.g., elasticity) of at least one the path-generating components.

In some implementations, deformations to the one or more path-generating components of the motion descriptor 300 generate a "deformed" position away from a virtual rest state of at least one of the path-generating components, and the "deformed" path-generating components return to their virtual rest state over a time interval.

In some implementations, deformations to the one or more path-generating components of the motion descriptor 300 cannot be performed using actual physical components.

As shown in FIG. 5, the motion descriptor 300 of FIG. 3 has been deformed into motion descriptor 500 that results in modified 3D motion curve 350". As shown in FIG. 5, a first operation 510 by the user proportionally increased a first dimension C of the 3D motion curve 350 by 40% to generate in modified 3D motion curve 350". In some implementations, the motion descriptor 300 of FIG. 3 is then modified into the deformed motion descriptor 500, which then results in or generates the modified 3D motion curve 350". Accordingly, in some implementations, the displayed 3D motion curve 350 itself can be visually modified by the user, and the modified 3D motion curve 350" is inversely mapped (e.g., reverse engineered) to generate the deformed motion descriptor 500. In some implementations, the modification to the 3D motion curve 350 (e.g., operation 510) in FIG. 5 can be implemented sequentially or concurrently in more than one step. The result of the first operation 510 is the modified 3D motion curve 350" that generates the modified motion descriptor 500, which results in the modified 3D motion curve 350". In some operations, the motion descriptor 500 and the modified 3D motion curve 350" can be stored for future use (e.g., added to a library of motion descriptors). In some implementations, the deformed motion descriptor 500 is only generated upon completion of more than one (e.g., all) visual modifications by the user to transform the motion curve 350 into the modified motion curve 350".

Returning to FIG. 3, in some implementations, deformations to the motion descriptor 300 include replacing one or more components of the motion descriptor 300. In some implementations, the second gear 340 component can be replaced with an ellipse, an ovoid, or a conical pyramid (e.g., non-circular gear) to generate the modified 3D motion curve 350' that would vary the speed of the point 334 around modified 3D motion curve 350' (e.g., and vary a longitudinal dimension) relative to the motion curve 350.

As shown in FIG. 6, the motion descriptor 300 of FIG. 3 has been deformed into motion descriptor 600 that results in modified 3D motion curve 350'''. A first operation 610 is a user operation to modify elasticity of one or more components of the motion descriptor 300. As shown in FIG. 6, the elasticity is modified to be 60% for a selected portion of the gear 340' identified by the dotted line and the remaining path-generating components of the motion descriptor stay rigid. A second operation 620 pulls the stretchable portion of gear 340' from an initial or rest position (e.g., as shown in FIG. 3) along the direction D to the deformed elongated position shown in FIG. 6 at a start position S1 of the motion curve 350'''. The elastic portion of the second gear 340' begins to wobble between the deformed elongated position and the rest position until eventually returning to the rest positon by the completion of the motion curve 350'''. Thus, a decreasing characteristic wobble is added to a portion of the modified 3D motion curve 350''' in FIG. 6. A decreasing wobble in the motion curve 350''' starts when the elasticized portion of the gear 340' meets the gear 310 at position S2 of the modified 3D motion curve 350''' during the clockwise turning of the gear 340' and counterclockwise turning of gear 310. In some implementations, the first operation 610 and second operation 620 can be performed concurrently. The result of the first operation 610 and second operation 620 is the modified motion descriptor 600 that results in modified 3D motion curve 350'''. In some operations, the motion descriptor 600 and the modified 3D motion curve 350''' can be stored for future use.

Although in FIGS. 4-6, modifications to the motion descriptor 300 of FIG. 3 were in one or two orthogonal directions, such operations are not so limited and in various implementations, can be implemented using 3-dimensional modifications or temporally dynamic 3-dimensional operations. Thus, in some implementations, a wobble from FIG. 6 could be side-to-side horizontally orthogonal to the direction the character is walking.

Figure 7:
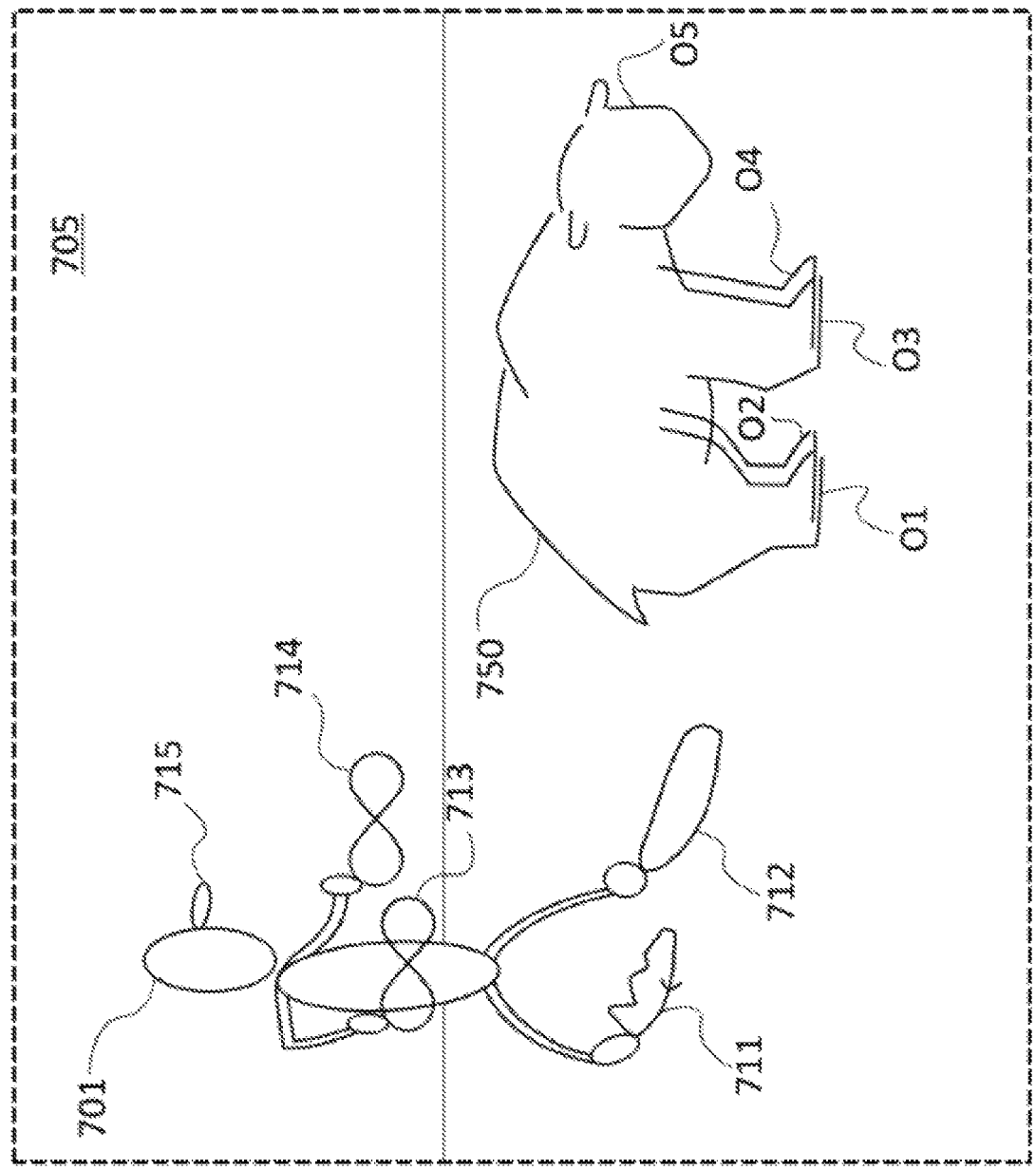
FIG. 7 is a diagram that shows an exemplary user interface allowing transfer of one or more 3D motion curves from a first 3D animated asset (e.g., first character) to a second 3D animated asset (e.g., second character) in accordance with some implementations.

FIG. 7 is a diagram that shows an exemplary user interface allowing transfer of one or more 3D motion paths from a first 3D digital model or animated asset (e.g., first character) to a second 3D digital model (e.g., second character). In some implementations, 3D motion paths are transferred from the first 3D digital model to the second 3D digital model, which has a different morphology (e.g., biomechanical structures, scalability), while some aesthetical aspects (e.g., animation technicalities, caricature) features identifiable to the first 3D animated character are maintained.

As shown in FIG. 7, a first 3D digital model 701 is a human with 5 motion paths for five objects and a second 3D digital model 750 is a quadruped bear with at least five objects to animate. As shown in FIG. 7, motion path 711 is transferred to a first object O1, motion path 712 is transferred to a second object O2, motion path 713 is transferred to a third object O3, motion path 714 is transferred to a fourth object O4, and motion path 715 is transferred to a fifth object O5. In some implementations, the motion path transfers shown in FIG. 7 are set to be the rule to transfer motion paths between a human and a bear. In FIG. 7, the first 3D digital model 701 and the second 3D digital model 750 are shown in an example 2D/3D environment 705.

Thus, in some implementations, for known morphologies or asset types, transfer rules can be preset and used to transfer motion paths from a first 3D digital model to a second 3D digital model. In some implementations, standard motion paths can be used to fill in for transfer rules between different morphologies of digital models. For example, when transferring motion paths from a chicken to a human, motion paths for the feet and head correspondingly transfer, but standard motion paths for human hands are used because wings motion paths do not correspond to hands. In some implementations, transfer rules between different 3D digital model morphologies address different proportions. For example, when transferring from a tiger to a cat, a function for size, proportion or scale, can be included to address 3D digital models of different sizes where motion paths are not a one-to-one mapping.

In some implementations, transfer rules between different 3D digital model morphologies address different priorities. In some implementations, when transferring from a humanoid to a quadruped, the humanoid feet may transfer to the back feet of the quadruped, but transferring hand motions to the front feet of the quadruped may need to address different priorities in the different morphologies. For example, when transferring "walking" motion paths from a humanoid to a dog, the walking dog will want to keep the back feet of the dog and the front feet of the dog (e.g., feet and hands) on the ground, so motion paths transferring to the front feet of the dog can be prioritized to keep the front feet on the ground when walking. In contrast, when transferring head motion paths between the humanoid to dog, there is more leeway for head movements of the dog, and so transfer rules can loosen constraints in areas that will not cause illegitimate character motion between different morphologies.

Further, in some implementations, transfer rules can be modified by the user. For example, if the motion path 711 is considered an identifying feature or caricature of the first digital model 701 (e.g., aesthetically important), the user may emphasize the feature by transferring the motion path 711 to the head O5, one ear, or the tail of the second 3D digital model 750 (bear).

Figure 8:
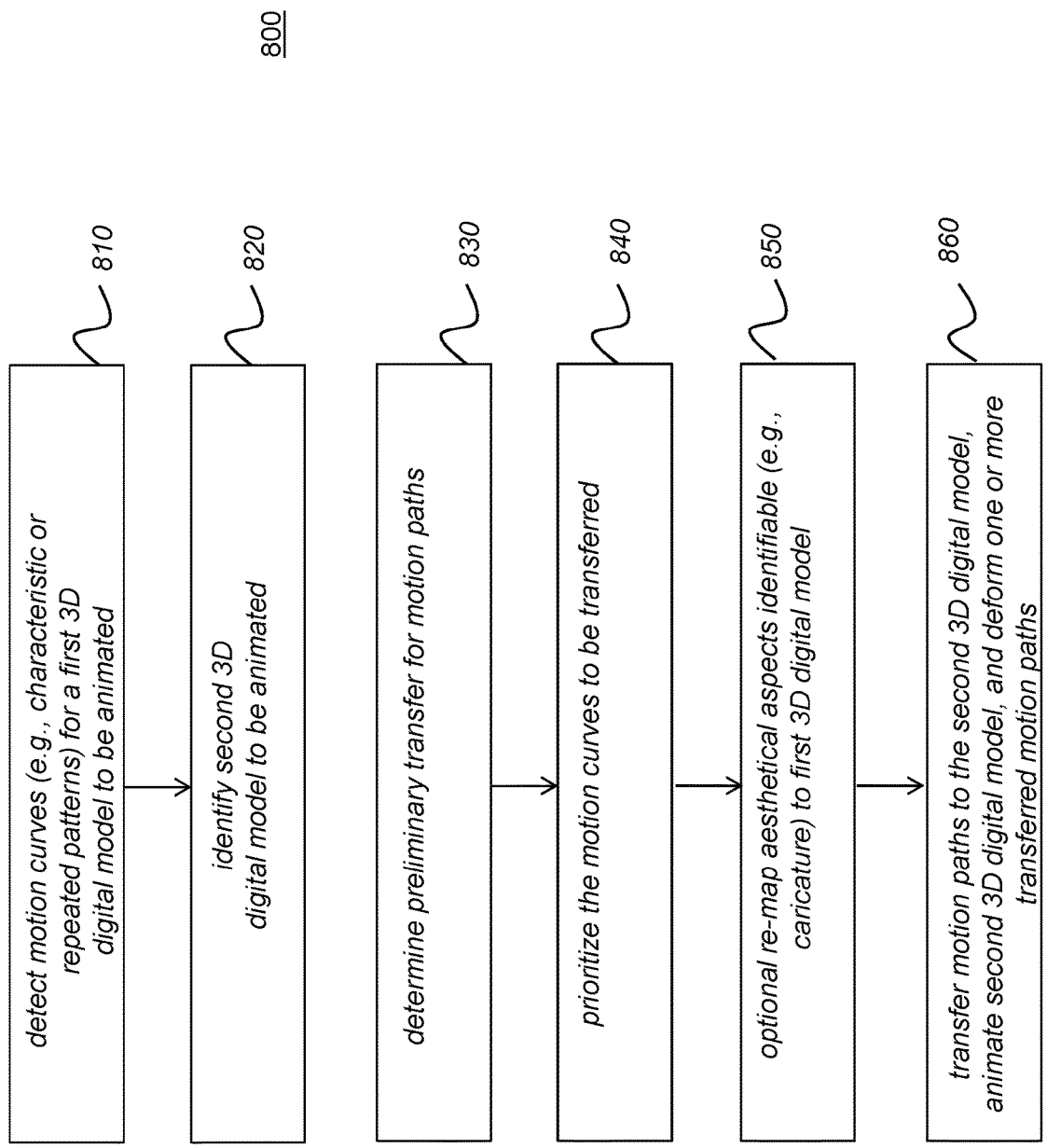
FIG. 8 is a flowchart illustrating an exemplary method to transfer one or more 3D motion curves from a first animated asset to a second animated asset in accordance with some implementations.

FIG. 8 is a flowchart illustrating an exemplary method to transfer of one or more 3D motion paths from a first digital model to a second digital model. In some implementations, the method 800 is performed by a device (e.g., controller 100 or HMD 120 of FIGS. 1-3). The method 800 can be performed at a mobile device, head mounted device (HMD), desktop, laptop, server device, or by multiple devices in communication with one another. In some implementations, the method 800 is performed by processing logic, including hardware, firmware, software, or a combination thereof. In some implementations, the method 800 is performed by a processor executing code stored in a non-transitory computer-readable medium (e.g., a memory).

At block 810, the method 800 obtains a type of the first 3D digital model and information to animate the first 3D digital model. In some implementations, information to animate includes a skeleton (e.g., bones and joints), a surface mesh (e.g., body) over the skeleton, and motion paths to animate limbs or primary objects of the 3D digital model. In some implementations, motion paths are provided for selected secondary objects. In some implementations, motion paths are provided for each item (e.g., bone) in the skeleton of the 3D digital model. In some implementations at block 810, the information to animate the first 3D digital model is provided by the user. Alternatively, the information to animate the first 3D digital model can be determined though motion capture or the like.

At block 820, the method 800 obtains the type of a second 3D digital model to be animated.

At block 830, the method 800 determines a preliminary transfer for motion paths from the first 3D digital model to the second 3D digital model. In some implementations, there is a library of transfer rules between types of 3D digital models. Thus, in some implementations, transfer rules between the first type and the second type of character can be presented for review and acceptance to the user. In some implementations, when transfer rules do not exist between the first type and the second type of characters, transfer rules from the first type to a third type of 3D digital model, which is similar to the second type of character, can be presented for review to the user. For example, when the first 3D digital model is a humanoid digital model (e.g., bipedal asset) and the second 3D digital model is a tiger (e.g., quadrupedal asset) and no transfer rules exist, at least one similar morphology can be identified and presented to the user. In this case where transfer rules exist from humanoid to other quadrupeds (e.g., transfer rules exist for humanoid to bear, and humanoid to cat), the user can be prompted to select among a presented cat transfer rule or bear transfer rules to be the preliminary transfer rule for humanoid to tiger.

At block 840, the method 800 prioritizes the motion paths to be transferred. In some implementations, prioritizing among the plurality of motion paths addresses an importance of movement of each object to the second 3D digital model or how constrained (e.g., exact) each motion path needs to be to maintain legitimate movements of the second 3D digital model. For example, for movements of the 3D digital model to appear legitimate, priority can be lower (e.g., fewer constraints) for hands compared to feet. In some implementations, lower priority can be related to time. Thus, in some implementations, animations related to deformed movements in a motion path or oscillating actions that return to a rest state can take longer for a lower priority object (e.g., hand) relative to a higher priority object (e.g., feet).

At block 850, the method 800 optionally re-maps aesthetical aspects identifiable (e.g., caricatures) as distinguishing features of the first 3D digital model to objects in the second 3D digital model. At block 850, the user can maintain or emphasize selected aesthetical aspects (e.g., animation technicalities) identifiable in animations of the first 3D digital model. For example, when there is a particular tic, quirk, tail wag, belly jiggle, or movement of a secondary object that is important in recognizing the 3D first digital model during animation, that motion path for the secondary object path is very important to maintain in the transfer to the second 3D digital model, because that secondary object motion is necessary for recognition. In some implementations, the secondary object motion can be used for recognition similar to an emphasized physical feature is used for recognition in a caricature of a character. In some implementations, the secondary object motion (e.g., key important aesthetical aspects) can be emphasized by transferring to a non-corresponding feature. For example, a distinguishing tail wag may be transferred to a smile of the second 3D digital model. In some implementations, the secondary object motion can be emphasized by prioritizing that motion path over other object motion paths transferred to the second 3D digital model.

In blocks 830, 840 and 850, the method 800 provides the user some amount of control in the motion path transfer process.

At block 860, the method 800 transfers motion paths from the first 3D digital model to the second 3D digital model, and animates the second 3D digital model using the transferred motion paths. At block 860, one or more transferred motion paths can then be deformed in accordance with some implementations.

The techniques disclosed herein are applicable in numerous different contexts. In some implementations, the techniques are used to create or edit 3D content that will be included in a CGR-based game, app, video, or user interface. The techniques disclosed herein can be performed at a mobile device, head mounted device (HMID), desktop, laptop, server device, or by multiple devices in communication with one another.

Figure 9:
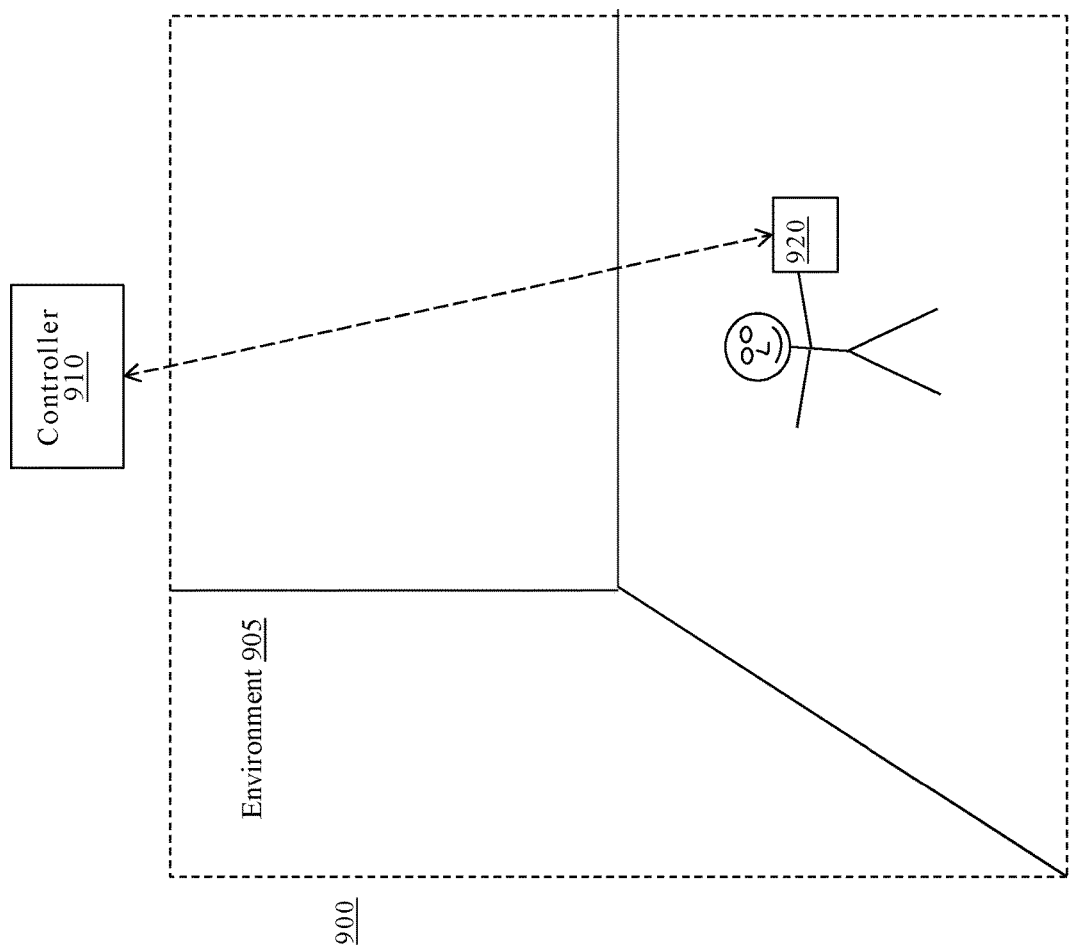
FIG. 9 is a block diagram of an example operating environment in accordance with some implementations.

FIG. 9 is a block diagram of an example operating environment 900 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 900 includes a controller 910 and an electronic device 920, one or both of which may be in a physical environment. A physical environment refers to a world that individuals can sense or with which individuals can interact without assistance of electronic systems. Physical environments (e.g., a physical forest) include physical objects (e.g., physical trees, physical structures, and physical animals). Individuals can directly interact with or sense the physical environment, such as through touch, sight, smell, hearing, and taste.

In some implementations, the controller 910 is configured to manage and coordinate a CGR experience for the user (e.g., content creator). In some implementations, the controller 910 includes a suitable combination of software, firmware, or hardware. The controller 910 is described in greater detail below with respect to FIG. 10. In some implementations, the controller 910 is a computing device that is local or remote relative to the physical environment 905.

In one example, the controller 910 is a local server located within the physical environment 905. In another example, the controller 910 is a remote server located outside of the physical environment 905 (e.g., a cloud server, central server, etc.). In some implementations, the controller 910 is communicatively coupled with the electronic device 920 via one or more wired or wireless communication channels (e.g., BLUETOOTH, IEEE 802.11x, IEEE 802.16x, IEEE 802.3x, etc.).

In some implementations, the electronic device 920 is configured to present the CGR experience to the user (e.g., content creator). In some implementations, the electronic device 920 includes a suitable combination of software, firmware, or hardware. The electronic device 920 is described in greater detail below with respect to FIG. 11. In some implementations, the functionalities of the controller 910 are provided by or combined with the electronic device 920.

According to some implementations, the electronic device 920 presents a CGR experience to the user while the user is present within the physical environment 905. In contrast to the physical environment, a CGR environment refers to an entirely or partly computer-created setting that individuals can sense or with which individuals can interact via an electronic system. In CGR, a subset of an individual's movements is monitored, and, responsive thereto, one or more attributes of one or more virtual objects in the CGR environment is changed in a manner that conforms with one or more physical laws. For example, a CGR system may detect an individual walking a few paces forward and, responsive thereto, adjust graphics and audio presented to the individual in a manner similar to how such scenery and sounds would change in a physical environment. Modifications to attribute(s) of virtual object(s) in a CGR environment also may be made responsive to representations of movement (e.g., audio instructions).

An individual may interact with or sense a CGR object using any one of his senses, including touch, smell, sight, taste, and sound. For example, an individual may interact with or sense aural objects that create a multi-dimensional (e.g., three dimensional) or spatial aural setting, or enable aural transparency. Multi-dimensional or spatial aural settings provide an individual with a perception of discrete aural sources in a multi-dimensional space. Aural transparency selectively incorporates sounds from the physical environment, either with or without computer-created audio. In some CGR environments, an individual may interact with or sense only aural objects.

One example of CGR is virtual reality (VR). A VR setting refers to a simulated setting that is designed only to include computer-created sensory inputs for at least one of the senses. A VR setting includes multiple virtual objects with which an individual may interact or sense. An individual may interact or sense virtual objects in the VR setting through a simulation of a subset of the individual's actions within the computer-created setting, or through a simulation of the individual or his presence within the computer-created setting.

Another example of CGR is mixed reality (MR). A MR setting refers to a simulated setting that is designed to integrate computer-created sensory inputs (e.g., virtual objects) with sensory inputs from the physical environment, or a representation thereof. On a reality spectrum, a mixed reality setting is between, and does not include, a VR setting at one end and an entirely physical environment at the other end.

In some MR settings, computer-created sensory inputs may adapt to changes in sensory inputs from the physical environment. Also, some electronic systems for presenting MR settings may monitor orientation or location with respect to the physical environment to enable interaction between virtual objects and real objects (which are physical objects from the physical environment or representations thereof), For example, a system may monitor movements so that a virtual plant appears stationery with respect to a physical building.

One example of mixed reality is augmented reality (AR). An AR setting refers to a simulated setting in which at least one virtual object is superimposed over a physical environment, or a representation thereof. For example, an electronic system may have an opaque display and at least one imaging sensor for capturing images or video of the physical environment, which are representations of the physical environment. The system combines the images or video with virtual objects, and displays the combination on the opaque display. An individual, using the system, views the physical environment indirectly via the images or video of the physical environment, and observes the virtual objects superimposed over the physical environment. When a system uses image sensor(s) to capture images of the physical environment, and presents the AR setting on the opaque display using those images, the displayed images are called a video passthrough. Alternatively, an electronic system for displaying an AR setting may have a transparent or semi-transparent display through which an individual may view the physical environment directly. The system may display virtual objects on the transparent or semi-transparent display, so that an individual, using the system, observes the virtual objects superimposed over the physical environment. In another example, a system may comprise a projection system that projects virtual objects into the physical environment. The virtual objects may be projected, for example, on a physical surface or as a holograph, so that an individual, using the system, observes the virtual objects superimposed over the physical environment.

An augmented reality setting also may refer to a simulated setting in which a representation of a physical environment is altered by computer-created sensory information. For example, a portion of a representation of a physical environment may be graphically altered (e.g., enlarged), such that the altered portion may still be representative of, but not a faithfully-reproduced version of the originally captured image(s). As another example, in providing video passthrough, a system may alter at least one of the sensor images to impose a particular viewpoint different than the viewpoint captured by the image sensor(s). As an additional example, a representation of a physical environment may be altered by graphically obscuring or excluding portions thereof.

Another example of mixed reality is augmented virtuality (AV) An AV setting refers to a simulated setting in which a computer-created or virtual setting incorporates at least one sensory input from the physical environment. The sensory input(s) from the physical environment may be representations of at least one characteristic of the physical environment. For example, a virtual object may assume a color of a physical object captured by imaging sensor(s). In another example, a virtual object may exhibit characteristics consistent with actual weather conditions in the physical environment, as identified via imaging, weather-related sensors, or online weather data. In yet another example, an augmented reality forest may have virtual trees and structures, but the animals may have features that are accurately reproduced from images taken of physical animals.

Many electronic systems enable an individual to interact with or sense various CGR environments. One example includes head mounted systems. A head mounted system may have an opaque display and speaker(s). Alternatively, a head mounted system may be designed to receive an external display (e.g., a smartphone). The head mounted system may have imaging sensor(s) or microphones for taking images/video or capturing audio of the physical environment, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one implementation, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical environment (e.g., onto a physical surface or as a holograph). Other examples of CGR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

Figure 10:
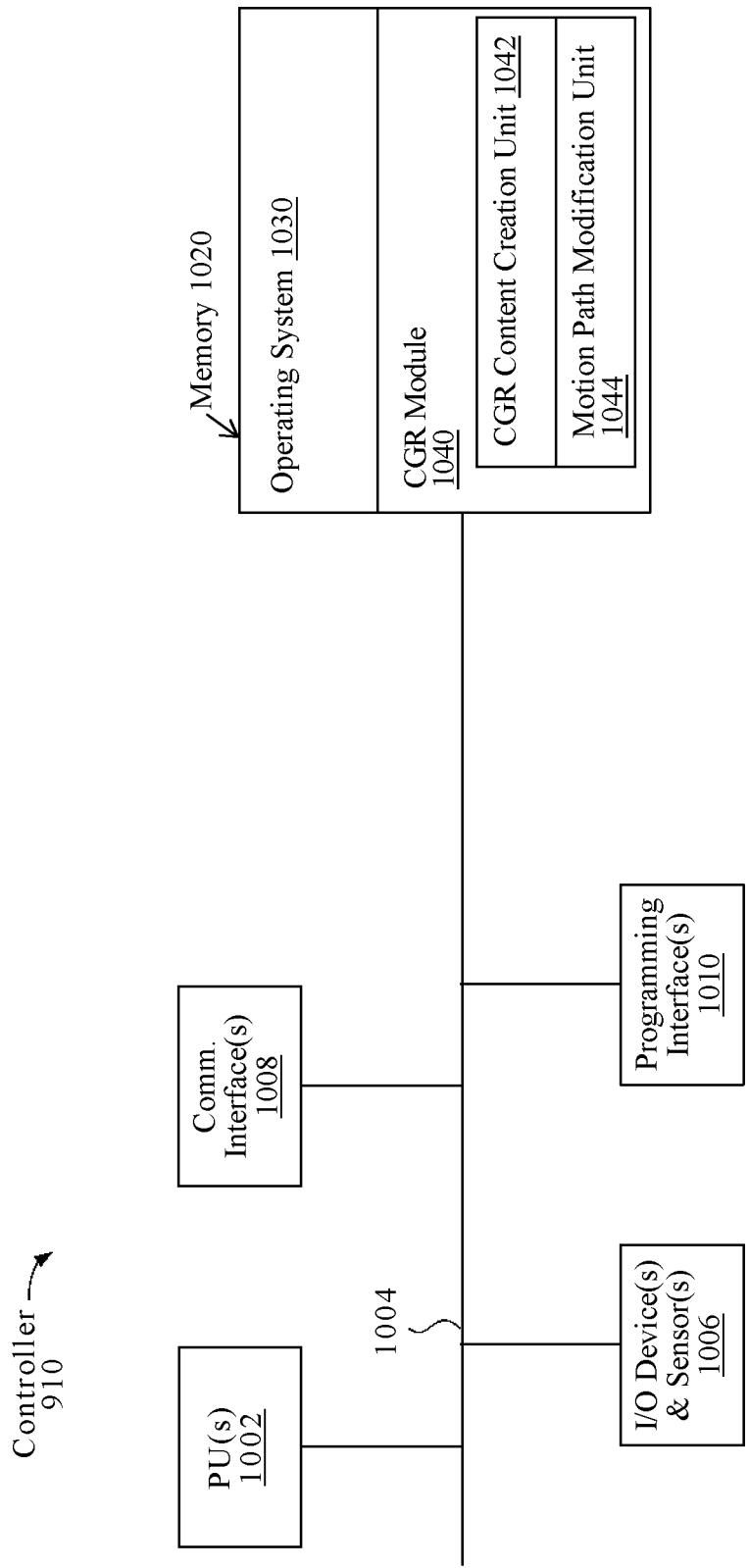
FIG. 10 is a block diagram of an example controller in accordance with some implementations.

FIG. 10 is a block diagram of an example of the controller 910 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 910 includes one or more processing units 1002 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 1006, one or more communication interfaces 1008 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 1010, a memory 1020, and one or more communication buses 1004 for interconnecting these and various other components.

In some implementations, the one or more communication buses 1004 include circuitry that interconnects and controls communications between system components. In some implementations, the one or more I/O devices 1006 include at least one of a keyboard, a mouse, a touchpad, a joystick, one or more microphones, one or more speakers, one or more image sensors, one or more displays, or the like.

The memory 1020 includes high-speed random-access memory, such as dynamic random-access memory (DRAM), static random-access memory (SRAM), double-data-rate random-access memory (DDR RAM), or other random-access solid-state memory devices. In some implementations, the memory 1020 includes non-volatile memory, such as one or more magnetic disk storage devices, optical disk storage devices, flash memory devices, or other non-volatile solid-state storage devices. The memory 1020 optionally includes one or more storage devices remotely located from the one or more processing units 1002. The memory 1020 comprises a non-transitory computer readable storage medium. In some implementations, the memory 1020 or the non-transitory computer readable storage medium of the memory 1020 stores the following programs, modules and data structures, or a subset thereof including an optional operating system 1030 and an CGR experience module 1040.

The operating system 1030 includes procedures for handling various basic system services and for performing hardware dependent tasks. In some implementations, the CGR module 1040 is configured to create, edit, or experience CGR experiences. The 3D content creation unit 1042 is configured to create and edit 3D content that will be used as part of CGR experiences for one or more users (e.g., a single CGR experience for one or more users, or multiple CGR experiences for respective groups of one or more users). A content-creation CGR experience may be provided by the CGR module 1040 to facilitate the creation of such content. For example, the user may view and otherwise experience a CGR-based user interface that allows the user to select, place, move, and otherwise configure virtual objects in 3D content that is being created or edited, for example, based on providing input via hand gestures, voice commands, input device inputs, etc. The motion path modification unit 1044 is configured to selectively modifying character motion during such a 3D content creation or editing experience using the modification and character motion transferring techniques disclosed herein, e.g., using deformable path-generating components of a motion descriptor, etc. Although these modules and units are shown as residing on a single device (e.g., the controller 910), it should be understood that in other implementations, any combination of these modules and units may be located in separate computing devices.

Moreover, FIG. 10 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 10 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 11:
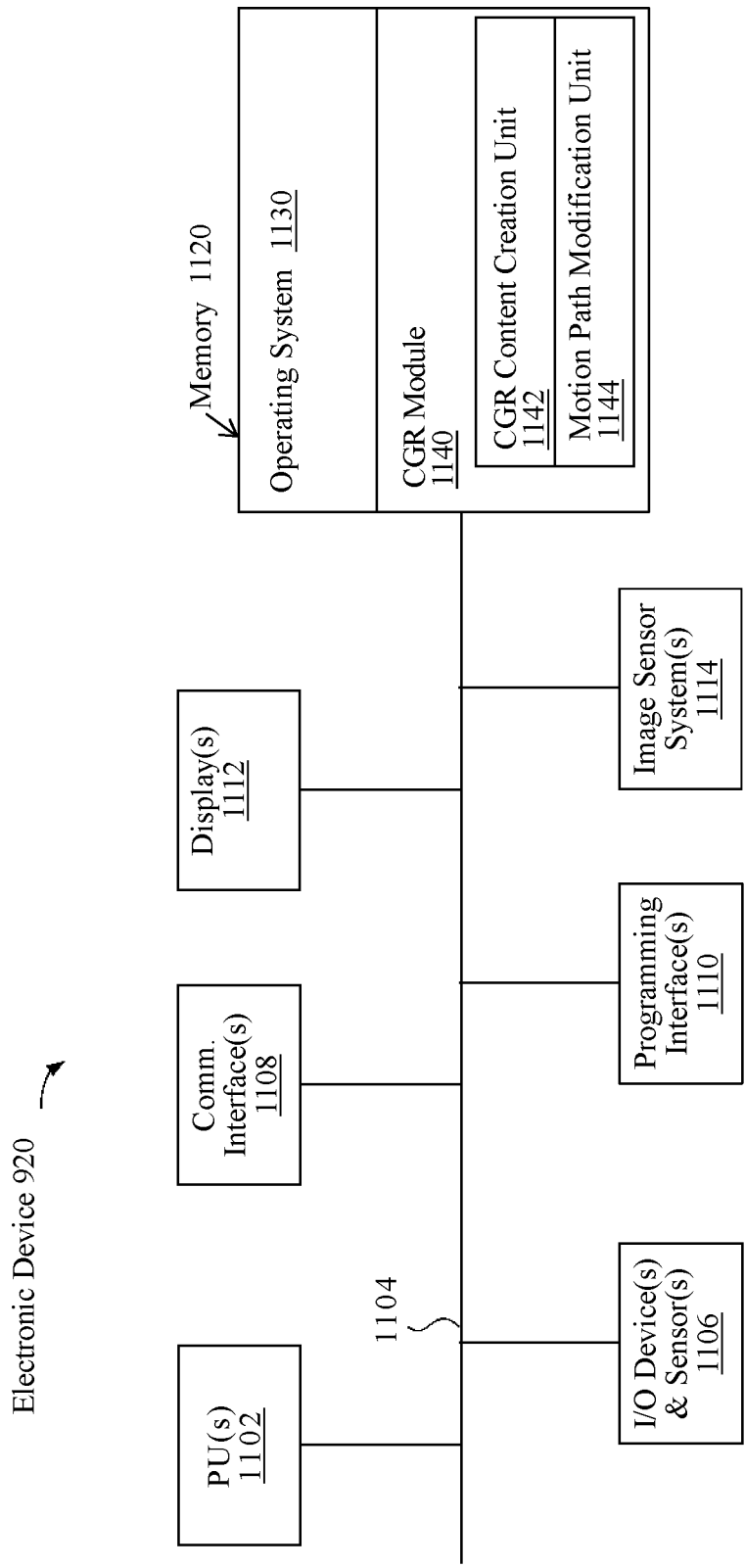
FIG. 11 is a block diagram of an example electronic device in accordance with some implementations.

FIG. 11 is a block diagram of an example of the electronic device 920 in accordance with some implementations.

While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 920 includes one or more processing units 1102 (e.g., microprocessors, ASICs, FPGAs, GPUs, CPUs, processing cores, or the like), one or more input/output (I/O) devices and sensors 1106, one or more communication interfaces 1108 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 1110, one or more displays 1112, one or more interior or exterior facing image sensor systems 1114, a memory 1120, and one or more communication buses 1104 for interconnecting these and various other components.

In some implementations, the one or more communication buses 1104 include circuitry that interconnects and controls communications between system components. In some implementations, the one or more I/O devices and sensors 1106 include at least one of an inertial measurement unit (TMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 1112 are configured to present an CGR experience to the user. In some implementations, the one or more displays 1112 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 1112 correspond to diffractive, reflective, polarized, holographic, etc. waveguide displays. For example, the electronic device 920 includes a single display. In another example, the electronic device 920 includes a display for each eye of the user.

In some implementations, the one or more image sensor systems 1114 are configured to obtain image data that corresponds to at least a portion of the face of the user that includes the eyes of the user. For example, the one or more image sensor systems 1114 include one or more RGB cameras (e.g., with a complimentary metal-oxide-semiconductor (CMOS) image sensor or a charge-coupled device (CCD) image sensor), monochrome camera, IR camera, event-based camera, or the like. In various implementations, the one or more image sensor systems 1114 further include illumination sources that emit light upon the portion of the face of the user, such as a flash or a glint source.

The memory 1120 includes high-speed random-access memory, such as DRAM, SRAM, DDR RAM, or other random-access solid-state memory devices. In some implementations, the memory 1120 includes non-volatile memory, such as one or more magnetic disk storage devices, optical disk storage devices, flash memory devices, or other non-volatile solid-state storage devices. The memory 1120 optionally includes one or more storage devices remotely located from the one or more processing units 1102. The memory 1120 comprises a non-transitory computer readable storage medium. In some implementations, the memory 1120 or the non-transitory computer readable storage medium of the memory 1120 stores the following programs, modules and data structures, or a subset thereof including an optional operating system 1130 and a CGR module 1140.

The operating system 1130 includes procedures for handling various basic system services and for performing hardware dependent tasks. In some implementations, the CGR module 1140 is configured to create, edit, or experience CGR experiences. The 3D content creation unit 1142 is configured to create and edit 3D content that will be used as part of CGR experiences for one or more users (e.g., a single CGR experience for one or more users, or multiple CGR experiences for respective groups of one or more users). A content creation CGR experience may be provided by the CGR module 1140 to facilitate the creation of such content. For example, the user may view and otherwise experience a CGR-based user interface that allows the user to select, place, move, and otherwise configure virtual objects in 3D content that is being created or edited, for example, based on providing input via hand gestures, voice commands, input device inputs, etc. The motion path modification unit 1144 is configured to selectively modifying character motion during such a 3D content creation or editing experience using the modification and character motion transferring techniques disclosed herein, e.g., using deformable path-generating components of a motion descriptor, etc. Although these modules and units are shown as residing on a single device (e.g., the electronic device 920), it should be understood that in other implementations, any combination of these modules and units may be located in separate computing devices.

Moreover, FIG. 11 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 11 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations, but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A non-transitory computer-readable storage medium, storing program instructions computer-executable on a computer to perform operations comprising:
   identifying an object to be animated, wherein the object is a part of a three dimensional (3D) digital model;
   identifying a motion descriptor comprising path-generating components that generate a preliminary motion path for animation of the object, wherein the preliminary motion path comprises positions for the object at various points in time;
   modifying, prior to animating the object and by deforming a path-generating component relative to other path generating components of the motion descriptor, the motion descriptor to generate a modified motion path for animation of the object, wherein the modified motion path comprises a modification to at least one position of the positions for the object; and
   animating the object based on the modified motion path.

2. The non-transitory computer-readable storage medium of claim 1, wherein modifying the path-generating component of the motion descriptor changes a shape, a size, a material property, or a plasticity of the path-generating component.

3. The non-transitory computer-readable storage medium of claim 1, wherein modifying the motion descriptor is based on user input modifying a characteristic of a displayed curve of the preliminary motion path.

4. The non-transitory computer-readable storage medium of claim 3, wherein the modifying the characteristic of the displayed curve is implemented by deformation of a path-generating component of the motion descriptor.

5. The non-transitory computer-readable storage medium of claim 1, wherein the preliminary motion path and the modified motion path are looped 3D motion curves.

6. The non-transitory computer-readable storage medium of claim 1, wherein:
   the object is a limb of a 3D digital character;
   there is one motion curve per limb; and
   each limb includes a primary object and secondary objects that move based on movement of the primary object.

7. The non-transitory computer-readable storage medium of claim 1, wherein a machine learning model identifies from input motion capture data, the motion descriptor, and wherein the modifying the motion descriptor comprises modifying a number of path-generating components, sizes of the path-generating components, positions of the path-generating components, connections of the path-generating components, which path-generating components are deformable, and an amount of deformation for any deformable path-generating components of the motion descriptor.

8. The non-transitory computer-readable storage medium of claim 1, further comprising displaying a user interface showing both the path-generating components of the motion descriptor and animation of at least the object of the 3D digital model, where the object is animated according to 3D motion paths generated as the motion descriptor is changed.

9. The non-transitory computer-readable storage medium of claim 1, wherein the modified motion path is a looped 3D motion curve, where the deformed path-generating component moves to a deformed state and returns to a rest state within one or more cycles of the looped 3D motion curve according to at least one material property characteristic.

10. The non-transitory computer-readable storage medium of claim 9, wherein the deformed path-generating component uses a deformable component to oscillate when moving from the deformed state to the rest state.

11. The non-transitory computer-readable storage medium of claim 1, wherein the modified motion path is one of a set of motion paths for character movement stages, where the character movement stages include walk, jog, run, jump or a plurality of respective transition actions between each of the character movement stages.

12. The non-transitory computer-readable storage medium of claim 1, further comprising:
mapping the motion descriptor of the object of the 3D digital model to a selected object on another 3D digital model of a same morphology or different morphology.

13. The non-transitory computer-readable storage medium of claim 1, further comprising:
re-targeting a plurality of motion paths for a first 3D digital character of a first character type to a second different 3D digital character; and
prioritizing among the plurality of motion paths to address legitimate motions of the second 3D digital character.

14. The non-transitory computer-readable storage medium of claim 1, wherein transferred 3D motion paths on different 3D digital characters maintain key aesthetical aspects identifiable to the 3D digital character.

15. The non-transitory computer-readable storage medium of claim 1, wherein modifying the motion descriptor is independent of modifying other motion descriptors associated with other parts of the 3D digital model.

16. A device comprising:
a non-transitory computer-readable storage medium; and
one or more processors coupled to the non-transitory computer-readable storage medium, wherein the non-transitory computer-readable storage medium comprises program instructions that, when executed by the one or more processors, cause the device to perform operations comprising:
identifying an object to be animated, wherein the object is a part of a three dimensional (3D) digital model;
identifying a motion descriptor comprising path-generating components that generate a preliminary motion path for animation of the object, wherein the preliminary motion path comprises positions for the object at various points in time;
modifying, prior to animating the object and by deforming a path-generating component relative to other path generating components of the motion descriptor, the motion descriptor to generate a modified motion path for animation of the object, wherein the modified motion path comprises a modification to at least one position of the positions for the object; and
animating the object based on the modified motion path.

17. The device of claim 16, wherein modifying the path-generating component of the motion descriptor changes a shape, a size, a material property, or a plasticity of the path-generating component.

18. The device of claim 16, wherein modifying the motion descriptor is based on user input modifying a characteristic of a displayed curve of the preliminary motion path.

19. A method comprising:
at an electronic device with a processor,
identifying an object to be animated, wherein the object is a part of a three dimensional (3D) digital model;
identifying a motion descriptor comprising path-generating components that generate a preliminary motion path for animation of the object, wherein the preliminary motion path comprises positions for the object at various points in time;
modifying, prior to animating the object and by deforming a path-generating component relative to other path generating components of the motion descriptor, the motion descriptor to generate a modified motion path for animation of the object, wherein the modified motion path comprises a modification to at least one position of the positions for the object; and
animating the object based on the modified motion path.

20. The method of claim 19, wherein modifying the motion descriptor is based on user input modifying a characteristic of a displayed curve of the preliminary motion path.

21. A non-transitory computer-readable storage medium, storing program instructions computer-executable on a computer to perform operations comprising:
identifying a preliminary motion path for animating an object, wherein the preliminary motion path comprises positions for the object at various points in time;
modifying a path-generating component relative to at least one other path-generating component associated with the preliminary motion path to generate a modified motion path for animating the object, wherein the modified motion path comprises a modification to at least one position of the positions for the object; and
animating the object based on the modified motion path.

22. The non-transitory computer-readable storage medium of claim 21, wherein at least one of the preliminary motion path or the modified motion path is a looped motion curve.

23. The non-transitory computer-readable storage medium of claim 21, wherein the path-generating component comprises a gear having a first shape and wherein modifying the path-generating component relative to the at least one other path-generating component associated with the preliminary motion path to generate the modified motion path for animating the object comprises deforming the gear into a second shape.

24. The non-transitory computer-readable storage medium of claim 21, where the preliminary motion path is a three-dimensional (3D) motion curve, and wherein modifying the path-generating component relative to the at least one other path-generating component associated with the preliminary motion path to generate the modified motion path for animating the object comprises increasing or decreasing at least one dimension of the 3D motion curve.

* * * * *